United States Patent
Raja et al.

(10) Patent No.: US 11,890,597 B2
(45) Date of Patent: Feb. 6, 2024

(54) CATALYST COMPOSITION FOR DIFFERENT REFORMING TECHNIQUES

(71) Applicant: Council of Scientific & Industrial Research, New Delhi (IN)

(72) Inventors: Thirumalaiswamy Raja, Pune (IN); Veera Venkata Satyanarayana Chilukuri, Pune (IN); Vipul Subhash Patil, Pune (IN); Siva Prasad Mekala, Pune (IN); Ashok Kumar Venugopal, Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 363 days.

(21) Appl. No.: 16/765,924

(22) PCT Filed: Nov. 20, 2018

(86) PCT No.: PCT/IN2018/050764
§ 371 (c)(1),
(2) Date: May 21, 2020

(87) PCT Pub. No.: WO2019/102489
PCT Pub. Date: May 31, 2019

(65) Prior Publication Data
US 2020/0353450 A1    Nov. 12, 2020

(30) Foreign Application Priority Data

Nov. 22, 2017  (IN) .............................. 201711041862

(51) Int. Cl.
*B01J 23/86* (2006.01)
*C01B 3/40* (2006.01)
(Continued)

(52) U.S. Cl.
CPC ............... *B01J 23/866* (2013.01); *C01B 3/40* (2013.01); *B01J 37/036* (2013.01); *B01J 37/08* (2013.01);
(Continued)

(58) Field of Classification Search
CPC .. B01J 23/866; C01B 3/40; C01B 2203/0233; C01B 2203/0238; C01B 2203/1047
(Continued)

(56) References Cited

U.S. PATENT DOCUMENTS 3,645,915 A * 2/1972 Stiles ........................ C01B 3/40
423/239.1
7,223,354 B2 5/2007 Ramani et al.
(Continued)

FOREIGN PATENT DOCUMENTS

GB          1513291          * 6/1978

OTHER PUBLICATIONS

Alifanti et al., "Characterization of CeO2—ZrO2 Mixed Oxides. Comparison of the Citrate and Sol-Gel Preparation Methods," Chem. Mater. 2003, 15(2), pp. 395-40.
(Continued)

*Primary Examiner* — Douglas B Call
(74) *Attorney, Agent, or Firm* — Dilworth & Barrese, LLP

(57) ABSTRACT

The present invention provides a catalyst composition comprising different metal oxides wherein the catalyst composition comprising Ce, Cr and Ni oxides and a process for preparation thereof. The catalyst composition is used for different reforming techniques for the production of syn gas (CO+H$_2$) at the same time this material can be used in fuel cell as a anode for power generation as this synthesized material is having good thermal stability and can sustain various redox reaction cycles also.

6 Claims, 11 Drawing Sheets

(51) Int. Cl.
 *B01J 37/03* (2006.01)
 *B01J 37/08* (2006.01)
(52) U.S. Cl.
 CPC .................. *C01B 2203/0233* (2013.01); *C01B 2203/0238* (2013.01); *C01B 2203/1047* (2013.01)
(58) Field of Classification Search
 USPC ......................................................... 502/313
 See application file for complete search history.

(56) References Cited

U.S. PATENT DOCUMENTS

| | | | |
|---|---|---|---|
| 2002/0006374 A1 | 1/2002 | Kourtakis et al. | |
| 2005/0025701 A1* | 2/2005 | Bhat ................... | B01J 23/6522 |
| | | | 423/652 |
| 2012/0041246 A1* | 2/2012 | Scher ....................... | C01F 5/02 |
| | | | 502/305 |

OTHER PUBLICATIONS

Mohamad Hassan Amin et al., "Tri-reforming of methane for the production of syngas: Review on the process, catalysts and kinetic mechanism," APCChE 2015 Congress, Sep. 27-Oct. 1, 2015, pp. 1-9.

Katsutoshi Sato et al.; "Hydrogen Production from Bioethanol: Oxidative Steam Reforming of Aqueous Ethanol Triggered by Oxidation of Ni/Ce0.5Zr0.5O2-x at Low Temperature," ChemSusChem 2010, 3, pp. 1364-1366.

\* cited by examiner

CATALYST COMPOSITION FOR DIFFERENT REFORMING TECHNIQUES

FIELD OF THE INVENTION

The present invention relates to a catalyst composition comprising of different metal oxides wherein the catalyst is used for different reforming techniques as well as can be used in fuel cell as an anode for the generation of power and water as by product and a process for preparation thereof.

BACKGROUND AND PRIOR ART OF THE INVENTION

Solid Oxide Fuel cell (SOFC) is conversion system of electrochemical energy which converts chemical energy to electrical energy and heat with better efficiency of electrical energy and less emission of pollutant gases compared to the conventional combustion processes. This fuel cell is generally used extensively in power plants or power generation industries along with heat applications.

Widely used fuels for SOFC is syngas and operated at high temperatures ranging from 700-1100° C. Instead of using syngas mixture separately, it is known that the reforming of lower hydrocarbons especially methane is vividly used as a fuel directly at the anodic side of the SOFC operations called as direct internal reforming (DIR). However there are certain problems in the DIR since it is an endothermic reaction at the fuel inlet and will be difficult to maintain the required temperature. On the other hand external reforming can also be performed and then send the reformate gas (hydrogen, carbon monoxide, carbon dioxide and un-reacted methane) to the SOFC where the efficiency can be definitely increased.

Steam reforming of methane (SRM) is extensively used application in the SOFC setup, whether it is internal or external reforming as SRM is highly endothermic (Reaction 1) in addition to the small contribution of the exothermic reaction via water gas shift (WGS) reaction (Reaction 2).

$$CH_4 + H_2O \rightleftarrows 3H_2 + CO \quad \Delta H = 206 \text{ kJ/mol} \quad \text{Reaction (1)}$$

$$CO + H_2O \rightleftarrows H_2 + CO_2 \quad \Delta H = -41 \text{ kJ/mol} \quad \text{Reaction (2)}$$

As the overall reaction is still endothermic, the external energy (heat) given to the system is appreciably high. In order to reduce this, the active catalytic material synthesized should be perfect to carry out Oxidative/Partial reforming reaction (Reaction (3)) along with steam reforming reaction so that the energy given out by the exothermic reaction will be utilized by the endothermic reaction, this process can be termed as oxidative steam reforming of methane (OSRM).

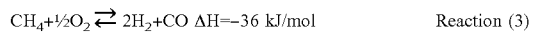
$$CH_4 + \tfrac{1}{2}O_2 \rightleftarrows 2H_2 + CO \quad \Delta H = -36 \text{ kJ/mol} \quad \text{Reaction (3)}$$

Article titled, "Tri-reforming of methane for the production of syngas: Review on the process, catalysts and kinetic mechanism" by Mohamad Hassan Amin et al. published in APCChE 2015 Congress incorporating Chemeca 2015 reports tri-reforming of methane for the production of syngas. The reforming of methane is considered as one of the industrially important process for decades, as the process converts natural gas to valuable syngas (a mixture of $H_2$ and CO). There are three major reforming processes, which are classified based on the energetics of the process and type of reforming agent. Catalytic steam reforming (endothermic reaction), partial oxidation (exothermic reaction) and auto-thermal reforming (combined exothermic and endothermic reactions) of methane are commercially available processes for syngas production. Carbon dioxide/dry reforming (endothermic reaction) is another alternative process that has received significant attention in recent years, which demonstrates the environmental benefit. However, due to their several limitations/drawbacks, a significant number of research activities are underway to explore more feasible process with consideration of techno-economic and environmental aspects. Recently, tri-reforming of methane received a lot of attention and this process are considered as an effective conversion and use of carbon dioxide in flue gas from power plants, called tri-reforming. Tri-reforming of methane (TRM) is a combination of steam, dry and partial oxidation of methane ($CH_4 + O_2 + CO_2 + H_2O$) which holds the main advantages and disadvantages of all processes to some extent.

Article titled, "Hydrogen Production from Bioethanol: Oxidative Steam Reforming of Aqueous Ethanol Triggered by Oxidation of $Ni/Ce_{0.5}Zr_{0.5}O_{2-x}$ at Low Temperature" by Katsutoshi Sato et al. published in *Chem Sus Chem* 2010, 3, 1364-1366 reports oxidative steam reforming of aqueous ethanol triggered by oxidation of $Ni/Ce_{0.5}Zr_{0.5}O_{2-x}$ at low temperature.

U.S. Pat. No. 7,223,354B2 disclosed catalysts and processes for converting a light hydrocarbon (e.g., natural gas) and oxygen to a product comprising a mixture of carbon monoxide and hydrogen ("synthesis gas" or "syngas"). More particularly, the invention relates to such processes and catalysts employing Ni—MgO containing catalysts.

However, the prior arts of this field have various drawbacks. Some of the prior arts for reforming techniques are using precious noble metals. Some of the catalyst disclosed in prior art are not stable above TOS 100 hr. Catalyst composition disclosed in prior art are usually showing activity for either one or two reforming technique. Catalyst composition disclosed in prior art may not work if they are sintered at 1400° C. Hence, there is need to develop a catalyst which is stable, free of noble metals and also useful for oxidative reforming without of a need of a heat source.

OBJECTIVES OF THE INVENTION

Accordingly, main objective of the present invention is to provide a catalyst composition comprising different metal oxides wherein the catalyst is used for different reforming techniques for the production of syn gas ($CO + H_2$) at the same time this material can be used in fuel cell as a anode for power generation as this synthesized material is having good thermal stability and can sustain various redox reaction cycles also.

Another objective of the present invention is to provide a process for the preparation of the catalyst.

SUMMARY OF THE INVENTION

Accordingly, the present invention provides a catalyst composition comprising of different metal oxides wherein the catalyst composition comprising Ce, Cr and Ni oxides.

The catalyst composition comprising Ce, Cr and Ni oxides present in the ratio 1-50% w/w, 20-49% w/w and 1-60% w/w respectively.

The catalyst is useful for oxidative steam reforming, dry and tri reforming and reforming of lower alcohols wherein the oxidative reforming is without much need of external heat source.

The catalyst is recyclable.

The catalyst is stable up to 800° C. even after sintering at 1400° C.

The catalyst is tested and found very stable in reactions up to 1-500 hours.

The catalyst is free of noble metals.

The catalyst is supported or unsupported.

In an embodiment, the present invention provides a process for the preparation of the catalyst composition comprising the steps of:
a) dissolving a nitrate precursor of metal in a solvent to obtain a solution of a metal nitrate precursor;
b) dissolving citric acid in the solvent to obtain a solution of citric acid;
c) adding the solution of metal nitrate precursor into the solution of citric acid followed by heating at temperature ranging from 100° C. to 190° C. until evaporation of solvent to form a gel;
d) keeping the gel of step (c) in oven at temperature ranging from 100° C. to 190° C. for 24 to 25 hours to form fluffy material of the catalyst followed by crushing fluffy material to powder.

The metal of step (a) is selected from Cr, Ce, or Ni.

The solvent used in the process for the preparation of the catalyst composition is water.

The nitrate precursor of metal of step (a) is selected from Chromium nitrate, Cerium nitrate, and nickel nitrate.

The catalyst can also be prepared with wet impregnation method as well as co precipitation method found similar catalytic activity and stability.

Abbreviation

YSZ-CCN: YetriastabilisedZirconium—Ce—Cr—Ni oxides
XRD: X-Ray Diffraction
BET: Brunauer-Emmett-Teller
HRTEM: High-resolution transmission electron microscopy
SRM: Steam reforming of methane
DRM: Dry reforming of methane
OSRM: Oxidative steam reforming of methane
S/C: Steam to Carbon ratio
GHSV: Gas hourly space velocity
JCPDS: Joint Committee on Powder Diffraction Standards

DETAILED DESCRIPTION OF THE INVENTION

Figure 1:
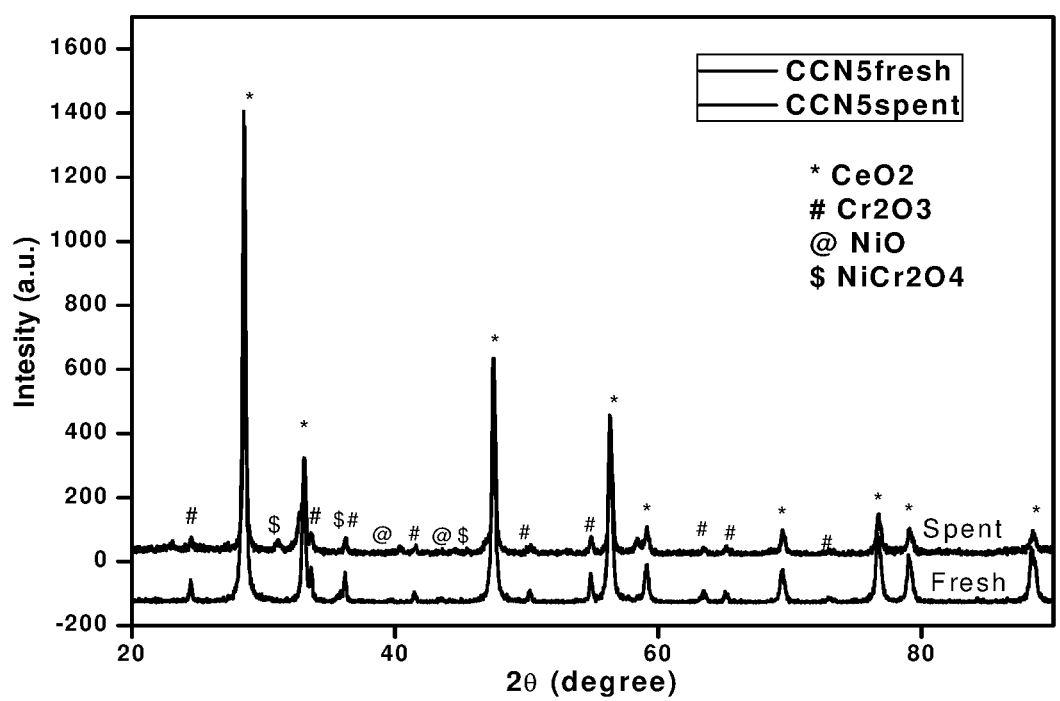
FIG. 1: XRD plot of CCN5 catalyst Fresh and Spent comparison

The invention will now be described in detail in connection with certain preferred and optional embodiments, so that various aspects thereof may be more fully understood and appreciated.

To overcome the aforesaid drawbacks in the prior arts, the present invention provides a catalyst composition which does not contain any precious metals in it. Further, catalyst composition of the present invention is tested for stability for up to TOS 500. The catalyst composition of the present invention can work for various reforming technique such as Steam reforming of Methane (SRM), dry reforming of Methane (DRM), Auto thermal reforming of Methane, Tri reforming, etc. The catalyst composition as disclosed in present invention is tested for sintering effect at 1400° C. and found durable at this temperature, this sintering is generally used to fabricate SOFC cell so catalyst can be fabricated into SOFC anode cell. The present invention discloses the composition which can be fabricated into anode cell of SOFC.

The present invention provides catalyst composition comprising different metal oxides wherein the catalyst is used for different reforming techniques for the production of syn gas ($CO+H_2$) at the same time this material can be used in fuel cell as a anode for power generation as this synthesized material is having good thermal stability and can sustain various redox reaction cycles also and a process for preparation thereof.

In an embodiment, the present invention provides a catalyst composition comprising of different metal oxides wherein the catalyst composition comprising Ce, Cr and Ni oxides.

The catalyst composition comprising Ce, Cr and Ni oxides present in the ratio 1-50% w/w, 20-49% w/w and 1-60% w/w respectively.

The catalyst is useful for oxidative steam reforming, dry and tri reforming, wherein the oxidative reforming is without of a need of a heat source.

The catalyst is recyclable.

The catalyst is stable up to 800° C. even after sintering at 1400° C.

The catalyst is found as a stable catalyst in reactions up to 1-500 hours and can be used for further more time on stream studies.

The catalyst is free of noble metals.

The catalyst is supported or unsupported.

The catalyst is used for the production of syn gas ($H_2$ and CO).

The catalyst gives good conductivity and also possesses good thermal stability.

The catalyst also acts on a variety substrates like methane, methanol and so on, so multiple fuels can be used for the production of syn gas.

The catalyst can be used for internal as well as external reforming.

The catalyst material can be used as an anode.

In another embodiment, the present invention provides a process for preparation of the catalyst composition comprising the steps of:
a) dissolving a nitrate precursor of metal in a solvent to obtain a solution of a metal nitrate precursor;

b) dissolving citric acid in the solvent to obtain a solution of citric acid;
c) adding the solution of metal nitrate precursor into the solution of citric acid followed by heating at the temperature ranging from 100° C. to 190° C. until evaporation of solvent to form a gel; and
d) keeping the gel of step (c) in oven at the temperature ranging from 100° C. to 190° C. for 24 to 25 hours to form fluffy material of the catalyst followed by crushing fluffy material to powder.

The metal of step (a) is selected from Cr, Ce, or Ni.

The solvent used in the process for the preparation of the catalyst composition is water.

The nitrate precursor of metal of step (a) is selected from Chromium nitrate, Cerium nitrate, and nickel nitrate.

The catalyst can also be prepared with wet impregnation method as well as co precipitation method found similar catalytic activity and stability.

Catalyst has been characterized with BET, XRD, and recyclability. Multi functionality and energy balance are important features of the present invention. Also usually for oxidative steam, reforming noble gas is needed, however in the present invention no noble element is used, hence exactly opposite is demonstrated.

Activity of the catalyst is good for all the reforming techniques with the Partial/Oxidative Steam reforming so that it can be used in SOFC without any need of external energy source.

Catalytic activity is highly stable and maintained with electrical conductivity and thermal stability with more yield.

Catalytic activity is high along with electrical conductivity and thermal stability for steam reforming of methane (SRM), Dry reforming (DRM), Oxidative steam reforming (OSRM), Tri Reforming of methane, lower alcohols reforming techniques.

Following table 1 elaborates all the compositions of catalyst which were synthesized and tested for reforming activity.

TABLE 1

| Sl. No | Catalyst | YSZ-CCN (composition fraction %) | | Catalyst composition in (wt %) | | |
|---|---|---|---|---|---|---|
| | | YSZ | CCN | Ce | Cr | Ni |
| 1 | CCN-YSZ (A1) | 50 | 50 | 25 | 20 | 5 |
| 2 | CCN-10 (A2) | 0 | 100 | 50 | 40 | 10 |
| 3 | CCN-7.5 (A4) | 0 | 100 | 50 | 42.5 | 7.5 |
| 4 | CCN-5 (A3) | 0 | 100 | 50 | 45 | 5 |
| 5 | CCN-2.5 (A6) | 0 | 100 | 50 | 47.5 | 2.5 |
| 6 | CCN-1 (A5) | 0 | 100 | 50 | 49 | 1 |
| 7 | C-0-CN (B1) | 0 | 100 | 0 | 50 | 50 |
| 8 | C-1-CN (B2) | 0 | 100 | 1 | 49 | 50 |

All the synthesized catalysts are investigated using the techniques like XRD, TEM, BET surface area as well as TGA techniques.

Figure 2:
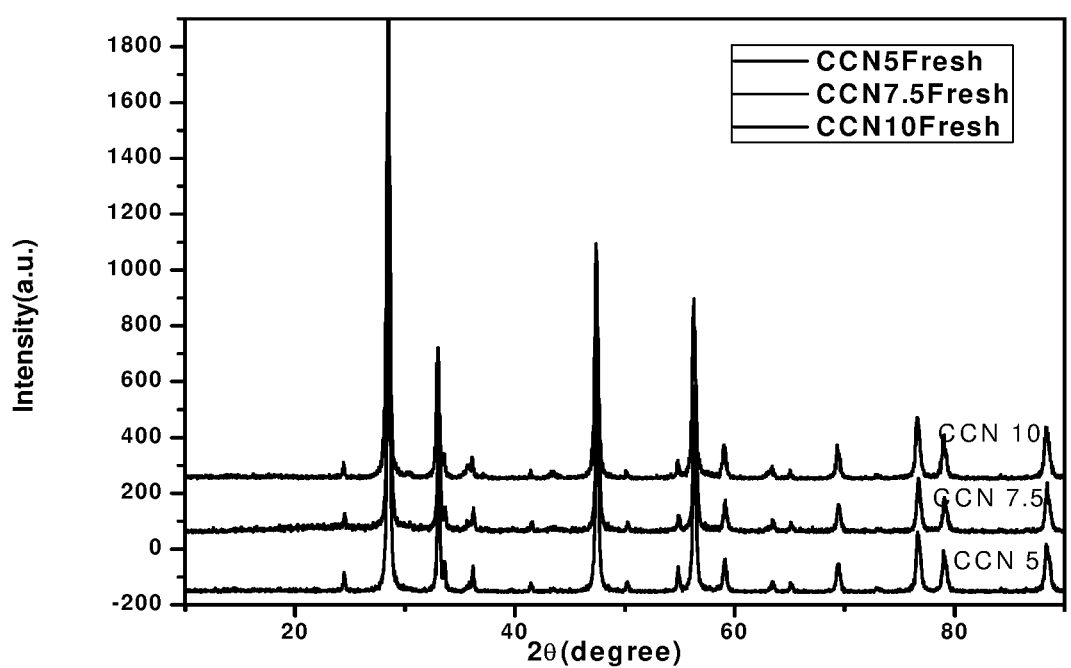
FIG. 2: Combined XRD Plot of Fresh catalysts
Figure 3:
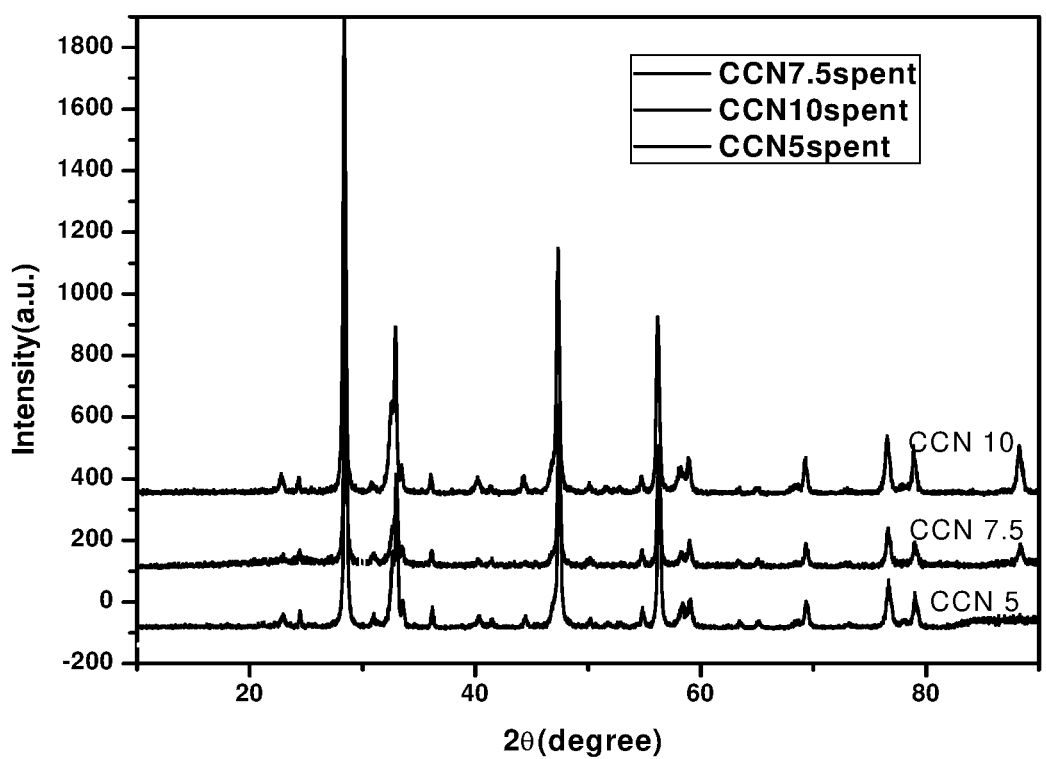
FIG. 3: Combined XRD Plot of Spent Catalysts
Figure 4:
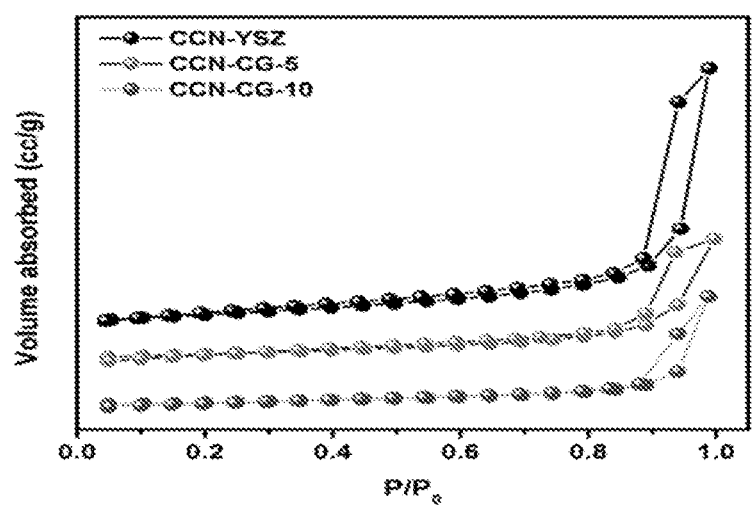
FIG. 4: BET surface area Plot of CCN Catalysts

2θ Vs Intensity profile shown in FIG. 1 for a fresh catalyst which clearly shows the presence of following mixed metal oxides phases like $CeO_2$, $Cr_2O_3$, NiO as well as $NiCr_2O_4$ spinel. It is also evidenced from the XRD data that the phases of $Cr_2O_3$ are rhombohedral and all other phases of NiO, $CeO_2$ and $NiCr_2O_4$ are cubic. The XRD patterns of fresh and spent catalysts are shown in FIG. 2 and FIG. 3 respectively. It is indicated that the samples are crystalline and identified as a mixture of oxides due to those sharp diffraction peaks. As shown in FIG. 1, those diffraction peaks are fully consistent with the standard JCPDS cards of $NiCr_2O_4$ (No. 89-6615), $Cr_2O_3$ (No. 84-1616), $CeO_2$ (No. 34-934) and NiO (No. 89-5881), respectively. FIG. 4 shows BET surface area Plot of CCN Catalysts. $N_2$ adsorption-desorption isotherms at 250° C. and the pore size distribution (PSD) according the Barrett-Joyner-Halenda (BJH) method for the CCN samples.

Table 2 shows pore size and PV table.

TABLE 2

| S. No | Catalyst | BET Surface area ($m^2$/g) [a] | Pore size (nm) | Pore Volume(PV) (cc/g) | Coke (%) [b] |
|---|---|---|---|---|---|
| 1 | CCN YSZ | 16.2 | 3.2 | 0.03 | 4.8 |
| 2 | CCN 5 | 6.57 | 1.6 | 0.03 | 4.5 |
| 3 | CCN 7.5 | 9.9 | 1.7 | 0.01 | 4.4 |
| 4 | CCN 10 | 10.76 | 3.04 | 0.02 | 3.2 |
| 5 | CCN 5 sin | 1.3 | 0.9 | 0.001 | 4.6 |

[a] represents BET Surface area analysis, [b] represents TGA analysis of Spent catalyst.

TGA analysis of spent catalyst has been done and found that there is very negligible coke deposition on the catalysts.

Figure 5:
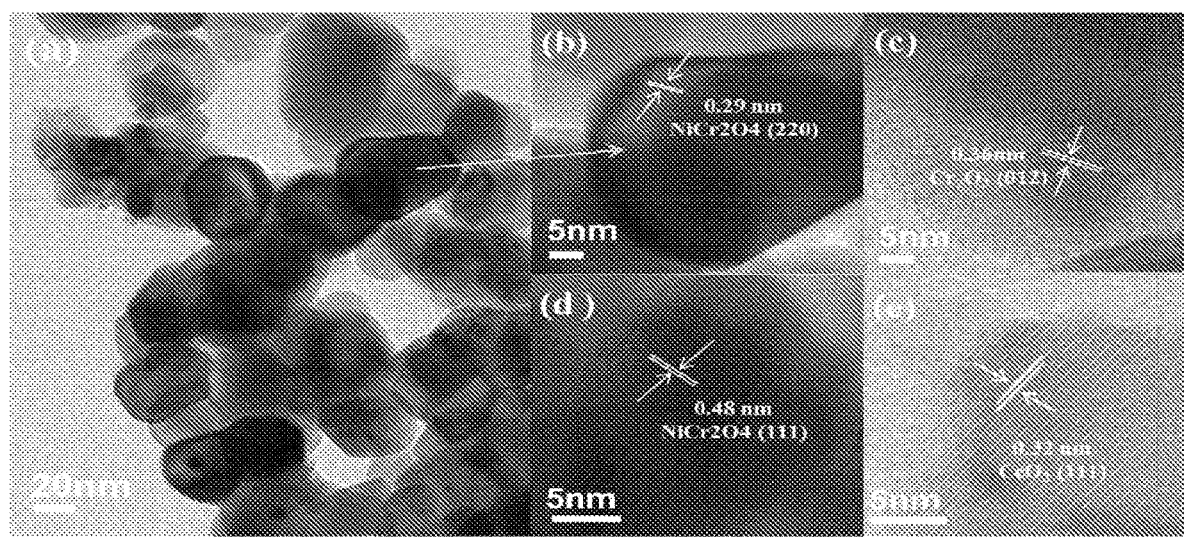
FIG. 5: HRTEM micrograph of fresh CCN catalyst

TEM micrograph demonstrated that the synthesized catalyst nanoparticles are spherical in shape along with well-defined lattice plane with lattice fringes which confirmed the crystallinity of the nanomaterial. The lattice fringes observed in case of FIGS. 5(b) and 5(d) corresponds to interplanar spacing of (220) and (111) plane respectively which confirmed the existence of spinel phase ($NiCr_2O_4$) of the catalyst. Whereas the lattice fringes observed in the FIGS. 5(c) and 5(e) corresponds to the (012) and (111) planes of $Cr_2O_3$ and $CeO_2$ nanoparticles respectively. The interplanar spacing which is observed in TEM images are well match with the measured XRD pattern of the catalyst.

Figure 6:
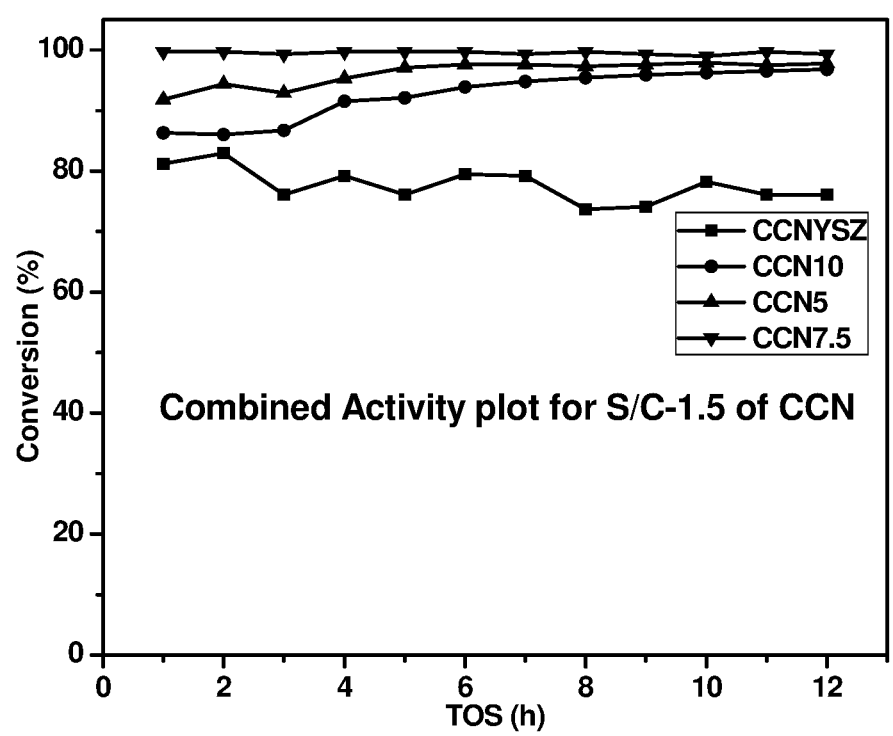
FIG. 6: Combined activity plot for S/C—1.5 at 800° C., 15000 $h^{-1}$ GHSV

FIG. 6 graph shows the conversion activity of $CH_4$ of all the catalyst run over a period of 12 hrs at 800° C., 15000 h−1 GHSV and S/C=1.5. Catalyst prepared with 7.5% Ni (CCN7.5), 5% Ni (CCN5) and 10% Ni (CCN10) gave the better activity and the $CH_4$ conversion is around 97-98%, 93-96% and 89-94% respectively with $H_2$ selectivity around 75-76% for CCN 7.5, 74-76% CCN 5 and 72-73% for CCN 10.

Figure 7:
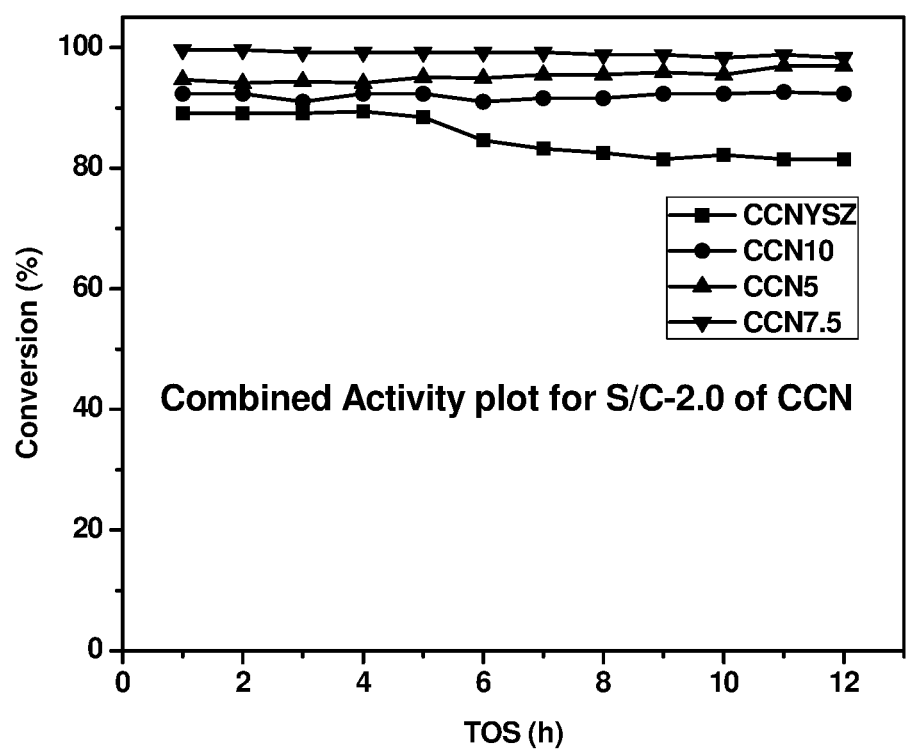
FIG. 7: Combined activity plot for S/C—2 at 800° C., 15000 $h^{-1}$ GHSV

FIG. 7 graph shows the conversion activity of $CH_4$ of all the catalyst run over a period of 12 hrs at 800° C., 15000 h−1 GHSV and S/C=2. Catalyst prepared with 7.5% Ni (CCN7.5), 5% Ni (CCN5) and 10% Ni (CCN10) gave the better activity and the $CH_4$ conversion was close to 97-98.5%, 94-97% and 91-93% respectively with $H_2$ selectivity around 76-78% for CCN 7.5, 74-76% CCN 5 and 73-75% for CCN 10.

Figure 8:
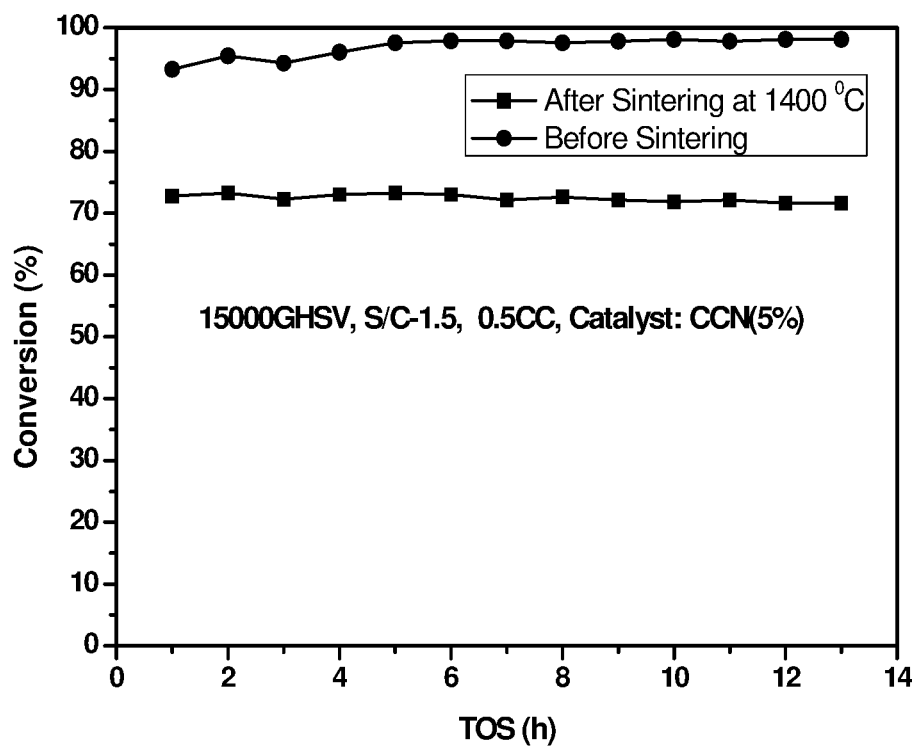
FIG. 8: Comparison plot of sintered and non-sintered catalyst at 800° C., 15000 $h^{-1}$ GHSV and S/C=1.5

FIG. 8 graph shows the comparison in conversion activity of $CH_4$ of the catalyst CCN5 before and after sintering at 1400° C. run over a period of 12 hrs at 800° C., 15000 h−1 GHSV and S/C=1.5 and found to be thermally stable, thus can be used as cermet.

Figure 9:
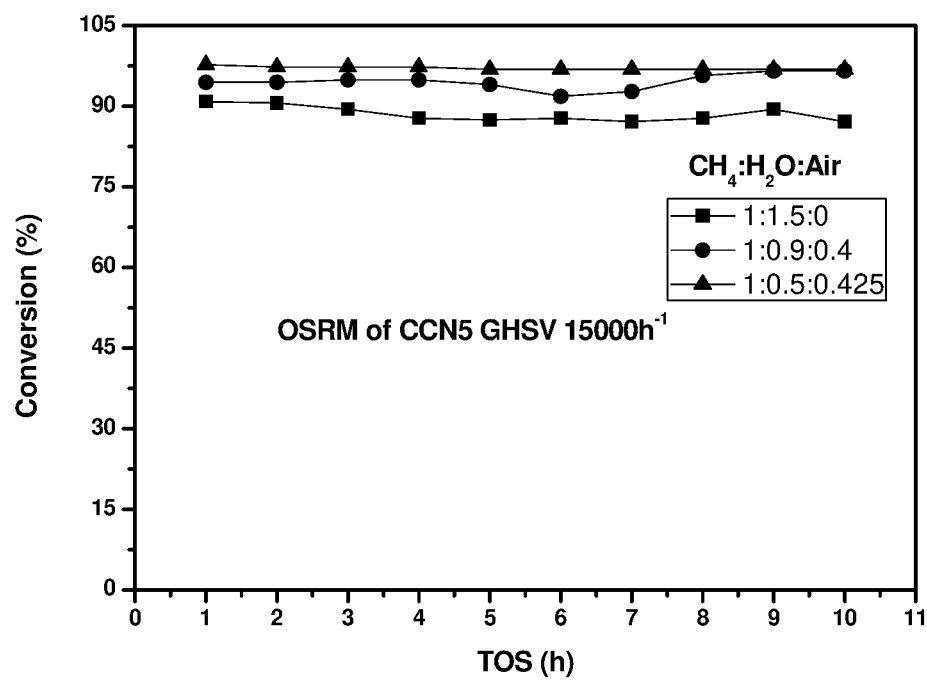
FIG. 9: Activity plot for OSRM at 800° C., 15000 $h^{-1}$ GHSV

FIG. 9 graph shows the conversion activity of $CH_4$ of catalyst CCN5 run over a period of 12 hrs, 15000 h−1 GHSV varying S/C from 1.5 to 0.5 which is much less than the required Stoichiometric ratio. Thus the catalyst is stable in oxidative conditions also.

Figure 10:
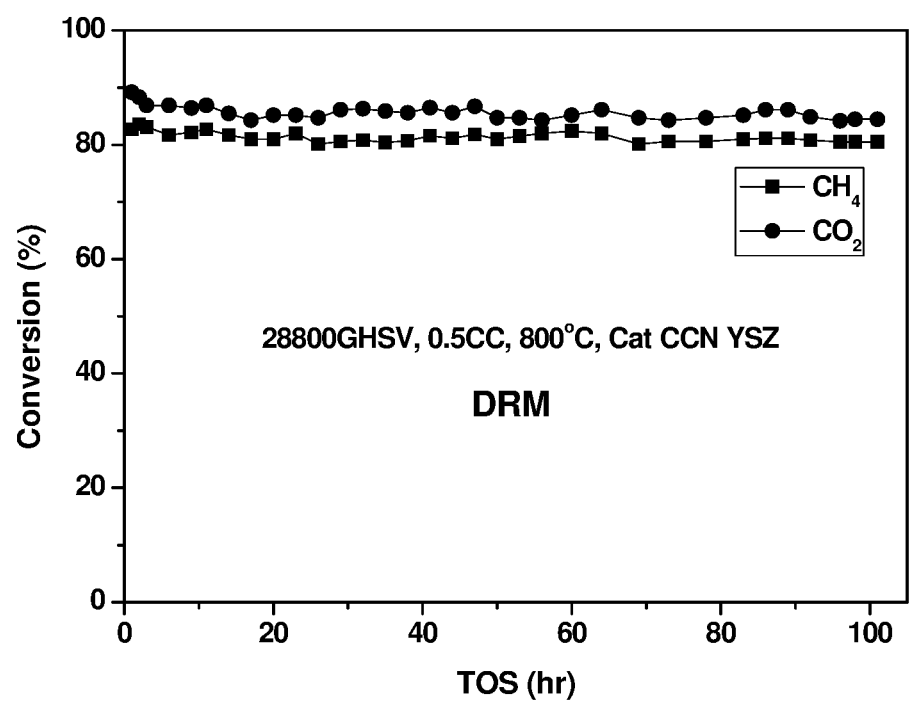
FIG. 10: Activity plot of DRM for CCN YSZ catalyst at 800° C., 28800 $h^{-1}$ GHSV

FIG. 10 graph shows the conversion activity of $CH_4$ and $CO_2$ of CCN-YSZ catalyst run over a period of 100 hrs at 800° C., 28800 h−1 GHSV. Around 80-85% conversion of $CH_4$ and 85-90% conversion of $CO_2$ is observed and catalyst is found to be stable throughout the run.

Figure 11:
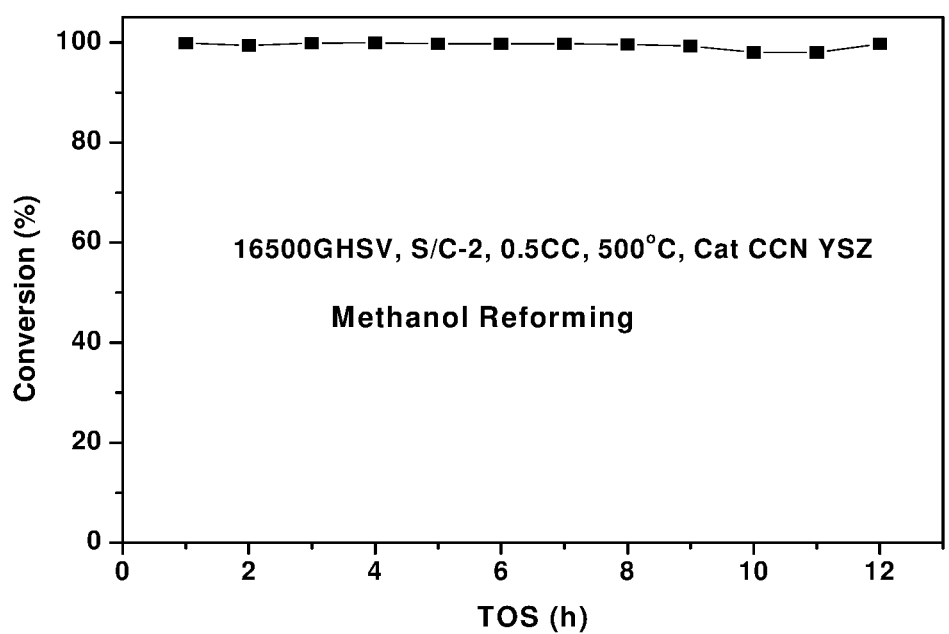
FIG. 11: Activity plot of Methanol Reforming for CCN YSZ catalyst

FIG. 11 graph shows the conversion activity of $CH_3OH$ by CCN-YSZ catalyst over a period of 12 hrs at 500° C., 28800 h−1 GHSV and S/C=2. Around 95-99% conversion of $CH_3OH$ is observed and catalyst is found to be stable throughout the run.

Data generated shows methane conversion is 100% within an hour to syn gas and remains same for 13-14 hours. Energy balance is close to 100%. Process is environmentally friendly because of reduced water production and therefore reduced $CO_2$ production. Dry reforming of methane and $CO_2$ tested for 100 hours and 85% conversion is seen at 550° C. and for 12 hours.

EXAMPLES

Following examples are given by way of illustration therefore should not be construed to limit the scope of the invention.

Example 1: Synthesis of Catalyst

The catalysts were prepared by citrate gel method, for the preparation nitrate precursors of Ce, Cr and Ni were used (Alfa Aesar). These precursors are dissolved in minimal amount of distilled water. Citric acid is taken in 3:1 molar ratio of total ingredients and it is also dissolved in water. On a heating mantle with a stirrer at 190° C. in citric acid solution, these precursors are slowly added and left for few hours until the water is evaporated and a gel is formed. Addition starts at 100° C. and after addition, it is maintained at 190° C. Now this gel is kept in oven at 180° C. for 24 hours which will result in fluffy material formation. Further it is crushed to powder and is kept in furnace at 800° C. The compositions of Ce, Cr, Ni are mentioned in the proportions described in the table 1.

Advantages of the Invention

1. Catalyst is recyclable.
2. Catalyst is stable up to 800° C.
3. Catalyst can work even after sintering at 1400° C.
4. Catalyst is stable in reactions up to 500 hours.
5. Free of noble metals.
6. Catalyst is unsupported or supported on YSZ showing similar type of activity and stability.
7. Nickel Chromate spinel is also forming along with other metal oxides which is a very stable and material for reforming reactions.
8. Catalyst can be fabricated into Anode cell of SOFC.

We claim:

1. A process for preparation of a catalyst composition consisting of metal oxides of Ce, Cr and Ni, said process consisting of:
   a. dissolving nitrate precursors consisting of Cr, Ce and Ni in a solvent to obtain a solution of metal nitrate precursors;
   b. dissolving citric acid in the solvent to obtain a solution of citric acid, wherein citric acid is taken in 3:1 molar ratio of the solution of metal nitrate precursors of step (a);
   c. adding the solution of metal nitrate precursors of step (a) into the solution of citric acid of step (b) followed by heating at a temperature ranging from 100° C. to 190° C. until evaporation of the solvent to form a gel; and
   d. keeping the gel of step (c) in an oven at a temperature ranging from 100° C. to 190° C. for 24 to 25 hours to form a catalyst material followed by crushing the catalyst material to form a powder; and
   e. keeping the powder in a furnace at 800° C. to obtain the catalyst composition,
      wherein the nitrate precursors consists of chromium nitrate, cerium nitrate, and nickel nitrate, and
      wherein the process is carried out in absence of noble metals.

2. The process as claimed in claim 1, wherein the solvent is water.

3. A catalyst composition prepared by the process as claimed in claim 1, said composition consisting of:
   (a) 1-50% w/w of Ce oxide;
   (b) 20-49% w/w of Cr oxide; and
   (c) 1-60% w/w of Ni oxide,
      wherein the catalyst composition is recyclable and stable up to 800° C., and wherein the catalyst composition is stable up to 1400° C. after sintering.

4. The catalyst composition as claimed in claim 3, wherein the catalyst composition is characterised with a conversion of around 80-85% of methane and around 85-90% of carbon dioxide at 800° C.

5. The catalyst composition as claimed in claim 3, wherein the catalyst composition is further characterised with a 100% conversion of methane to syn gas in an hour and remain same for 13-14 hours by steam reforming of methane.

6. The catalyst composition as claimed in claim 3, wherein the catalyst composition is characterised with a 99% conversion of methane to syngas and remain same for more than 12 hours by oxidative steam reforming of methane in absence of a noble gas.

* * * * *